United States Patent [19]

Trowbridge

[11] 4,293,906

[45] Oct. 6, 1981

[54] CONVERTER

[76] Inventor: Lawrence E. Trowbridge, 4806 Oak St., Seabrook, Tex. 77658

[21] Appl. No.: 17,257

[22] Filed: Mar. 5, 1979

[51] Int. Cl.$^3$ .......................................... H02M 7/515
[52] U.S. Cl. ................................................. 363/135
[58] Field of Search ........................ 363/8, 27, 40, 135, 363/160, 161; 318/280, 287, 291, 293, 300, 345 R, 345 G, 722

[56] References Cited

U.S. PATENT DOCUMENTS

| | | | |
|---|---|---|---|
| Re. 27,193 | 10/1971 | Risberg | 363/138 |
| 3,089,076 | 5/1963 | Lee | 363/139 |
| 3,246,231 | 4/1966 | Clarke | 363/160 |
| 3,414,797 | 12/1968 | Morgan | 363/27 |
| 3,434,030 | 3/1969 | Bedford | 363/20 |
| 3,530,357 | 9/1970 | Leowald | 363/27 |
| 3,621,362 | 11/1971 | Schwarz | 363/27 |
| 3,794,906 | 2/1974 | Hoffman, Jr. et al. | 363/8 |
| 4,027,169 | 5/1977 | Lowther | 250/536 |
| 4,030,019 | 6/1977 | Bailey | 363/135 |
| 4,060,757 | 11/1977 | McMurray | 363/57 |

FOREIGN PATENT DOCUMENTS

| | | | |
|---|---|---|---|
| 2629407 | 1/1978 | Fed. Rep. of Germany | 363/8 |
| 1376711 | 9/1964 | France | 363/8 |

*Primary Examiner*—William M. Shoop
*Attorney, Agent, or Firm*—Guy E. Matthews

[57] ABSTRACT

A power converting apparatus and method comprising a transformer and converting circuit mounted with the transformer for converting direct current to a series of pulses in the primary winding which includes a pulse train forming an effective current with reciprocal positive and negative sine wave components for each half cycle of chosen frequency. A gating circuit is mounted with the transformer for sequentially passing the pulses in the positive sine wave components followed by the pulses in the negative sine wave component, the gating circuit passes the pulses received in the secondary winding synchronously with the pulses in each half cycle of the pulse train to form a chosen frequency alternating current component. A filter is mounted with the gating circuit for removing selected components of the received signal while providing an output of the chosen frequency alternating current.

8 Claims, 10 Drawing Figures

CONVERTER

BACKGROUND AND BRIEF DESCRIPTION OF THE INVENTION

Devices for converting direct current to alternating current are well known and have been used, for instance, at the receiving end of long distance transmission lines. Normally, these devices employ transformers that are massive relative to the power levels involved which implies high cost and precludes their use in many applications, notably downhole use in oil field operations.

It has been determined that the mass of a transformer is approximately directly proportional to its power handling capability and inversely proportional to the frequency of operation. Since most systems used in the United States operate at relatively low frequencies (e.g. approximately 60 cycles per second), it is obvious that commonly used high power/low frequency transformers are massive. Accordingly, by performing the necessary transformations at a relatively high frequency (e.g. equal to or greater than 10,000 cycles per second), the mass of the transformer may be lowered.

To accomplish these high frequency transformations, the present invention makes use of the trigonometric identity, sin (a) sin (b) = ½ cos (a−b) − ½ cos (a+b). This identity implies that the multiplication of two sine waves results in a wave form containing the sum and the difference of the two original frequencies. As an example, if the original frequencies are 10,000 cps and 10,060 cps, the resulting wave form consists of, primarily 20,060 cps and 60 cps components. If this wave form is then rectified by a synchronous rectifier, driven in synchronism with the 60 cps component and the resulting wave form passed through a low pass filter to remove the 20,060 cps component, the result is a nearly pure 60 cps sine wave.

In accordance with the invention, power converting apparatus for changing direct current into a chosen frequency alternating current comprises a transformer having a primary winding with a direct current supplied intermediate its ends and a secondary winding with a ground being mounted intermediate its ends. Means are mounted with the transformer for converting the direct current to a series of pulses in the primary winding which includes a pulse train forming an effective current with reciprocal positive and negative sine wave components for each half cycle of the chosen frequency. Gating means are mounted with the secondary of the transformer for sequentially passing the pulses in the negative sine wave component of the effective current followed by the pulses in a positive sine wave component. The gating means pass the pulses received in the secondary winding synchronously with pulses in each half cycle of the pulse train to form a chosen frequency alternating current component. A filter is mounted with the gating means for removing selected components from the gated signal while providing an output of chosen frequency alternating current.

Also, in accordance with the invention, a method of converting the direct current into chosen frequency alternating current comprises converting the direct current into a series of pulses which includes a pulse train forming an effective current with reciprocal positive and negative sine wave components for each half cycle of the chosen frequency. These pulses are supplied to the primary winding of the transformer and pulses received by the secondary winding of the transformer are then gated synchronously with the half cycles of the chosen frequency for alternately removing the negative and positive sine wave components of the effective current. The gated current is then passed through a filter to remove selected components of the received signal while providing an output of the chosen frequency alternating current.

BRIEF DESCRIPTION OF THE DRAWINGS

Other objects and advantages of the invention will become apparent upon reading the following detailed description and upon reference to the drawings, in which like reference characters are used throughout to designate like parts.

While the invention will be described in connection with a preferred embodiment and procedure, it will be understood that it is not intended to limit the invention to that embodiment and procedure. On the contrary, it is intended to cover all alternatives, modifications and equivalents as may be included within the spirit and scope of the invention as defined by the appended claims.

DETAILED DESCRIPTION OF THE INVENTION

Figure 1:
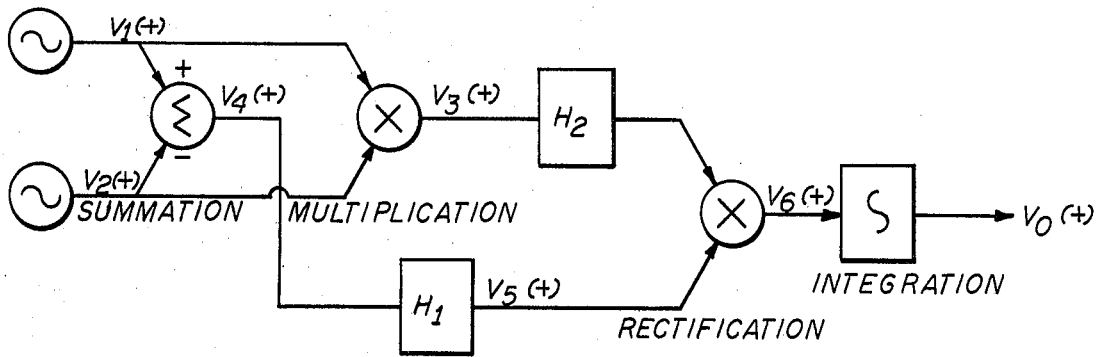
FIG. 1 is a block diagram of the present invention.
Figure 2:
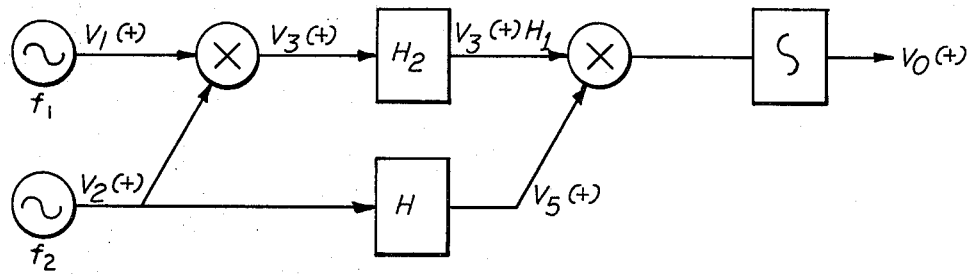
FIG. 2 is a block diagram of the present invention wherein $F_1' = 2f_1$, and wherein $F_2 = F_0$.

To better understand the theory of the invention, block diagrams, FIGS. 1 and 2, are shown. In each block diagram, two separate voltages at separate frequencies are introduced, $v_1(t)$ being the first voltage, expressed as a function of time at the frequency $f_1$, and $v_2(t)$ being the second voltage expressed as a function of time at the frequency $f_2$. Referring particularly to FIG. 1, $v_1(t)$ and $v_2(t)$ are two sine wave voltages whose frequencies are chosen such that $f_1 - f_2 = f_0$, which is the desired output frequency, and $f_1 + f_2 = f_4$, the frequency at which power is to be transformed or filtered, e.g. 20 kc. In the first step, the two frequencies ($f_1$ and $f_2$) are added, or summed, resulting in $v_4(t)$. Simultaneously therewith, the same two voltage frequencies ($f_1$ and $f_2$)

are mutiplied, resulting in $v_3(t)$. $V_3(t)$ is the waveform containing the voltage to be synchronously rectified for delivery to a load, and $v_4(t)$ is the waveform from which the control voltage for such rectification is to be derived.

A transformer, $H_1$, is inserted at a point following summation of the two frequencies, i.e. at $v_4(t)$, and performs a function which is complex in description but simple in execution; rectification, integration, differentiation and zero-crossing detection of the summed waveform. The output of $H_1$, $v_5(t)$ is either 1 or $-1$, i.e. the sign of the cosine of the phase angle $v_0$. Multiplying the absolute value of the waveform of FIG. 5 by 1 or $-1$ results in waveform of FIG. 9. Integrating this waveform over the duration of one cycle of $f_1+f_2$ removes the $f_1+f_2$ component (sin (x) integrated over $360° = 0$) leaving the $f_1-f_2$ component, $f_0$, the desired output frequency.

If a voltage transformation is required, a second, optional transformer $H_2$ may be inserted into the system at the output of the multiplication, at $v_3(t)$. If so used, $H_2$ will operate at a frequency of $f_1+f_2$.

Conversely, in FIG. 2, $f_1$ could be a power source of frequency $2f_1$ from the previous description and $f_2=f_0$, a lowerpower control source. In this instance the summation of $f_1+f_2$ would be unnecessary and $v_5(t)$ would be equal to $v_2(t)$ divided by the absolute valve of $v_2(t)$, or a zero-crossing detector only.

Figure 3:
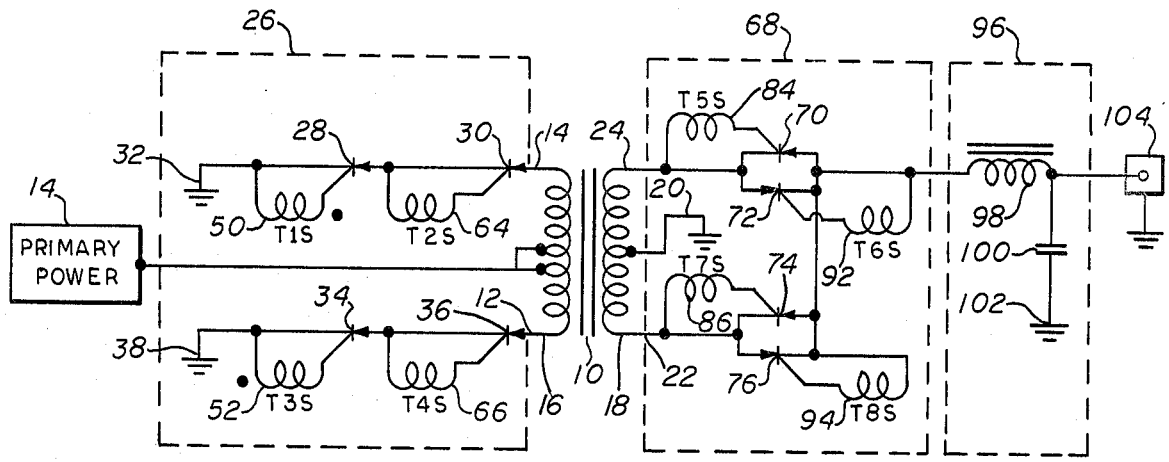
FIG. 3 is a circuit diagram showing power converting apparatus constructed according to the present invention.
Figure 4:
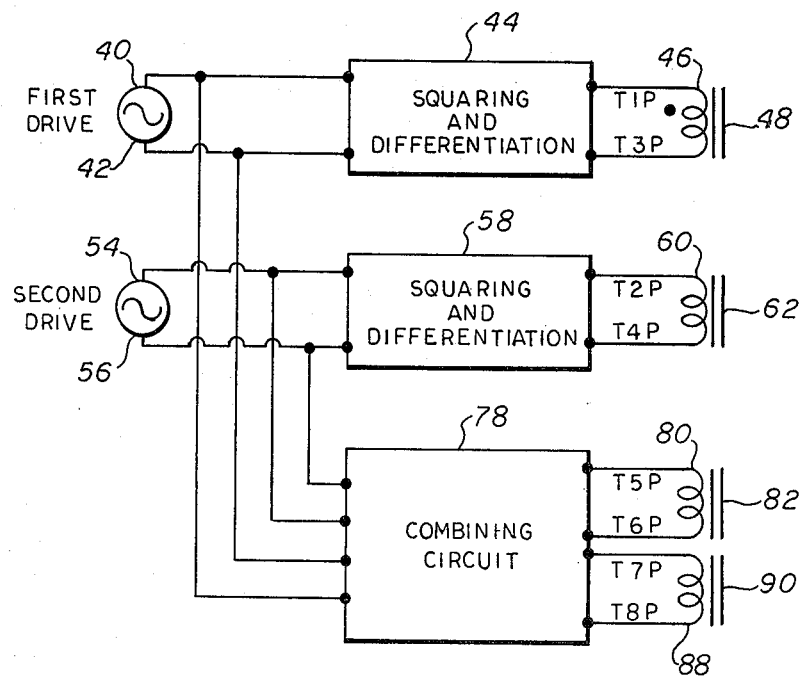
FIG. 4 is a block/circuit diagram of the sequencing and pulsing section of the power converting apparatus shown in FIG. 3.

In order to more fully explain the present invention, a preferred embodiment of a power converting apparatus for changing direct current to a chosen frequency alternating current is shown in FIGS. 3 and 4. This apparatus comprises a transformer 10 having a primary winding 12 with direct current supplied by primary power supply 14 intermediate ends 14 and 16. Transformer 10 further includes a secondary winding 18 which is grounded at 20 intermediate its ends 22 and 24.

Figure 5:
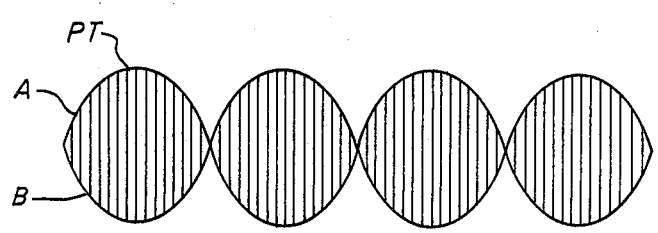
FIG. 5 is a diagram illustrating the waveform of effective current supplied to the primary of the transformer by the embodiment of the invention shown in FIGS. 3 and 4.

Means 26 are mounted with transformer 10 for converting the direct current to a series of pulses in primary winding 12. As best shown in FIG. 5, this series of pulses includes a pulse train PT(FIG. 5) forming an effective current with reciprocal positive and negative sine wave components, A and B, respectively, for each half cycle of the chosen frequency. Preferably, converting means 26 includes a first silicon controlled rectifier 28 and a second silicon controlled rectifier 30 mounted in series with end 14 of primary winding 12 of transformer 10, such as by connecting the anode of rectifier 30 to end 14 and its cathode to the anode of rectifier 28 with its cathode leading to a ground at 32. Converting means 26 further includes a third silicon controlled rectifier 34 and a fourth silicon rectifier 36 mounted in series with end 16 of primary winding 12, such as by connecting the anode of fourth rectifier 36 to end 16 and its cathode the anode of third rectifier 34 with its cathode leading to a ground at 38.

A first signal generating means 40 is used for alternately firing first rectifier 28 and third rectifier 34 and, preferably, includes a first drive generator 42 mounted with a squaring and differentiation circuit 44 which provides a signal to the primary 46 of firing generator transformer 48 for operating through secondary windings 50 and 52 mounted with the gates of first and second silicon controlled rectifiers 28 and 34, respectively. Secondary winding 52 is wound opposite to winding 50 so that first rectifier 28 and second rectifier 34 are alternately fired.

A second signal generating means 54 is used for simultaneously firing second silicon controlled rectifier 30 and fourth rectifier 36 and, preferably, includes a second drive generator 56 mounted to a squaring and differentiation circuit 58 which provides a signal to the primary 60 of a second firing transformer 62 mounted with secondary windings 64 and 66. Secondary windings 64 and 66 are wound in the same direction and are connected to the gates of second and fourth rectifier 30 and 36, respectfully, to permit simultaneous firing.

Figure 6:
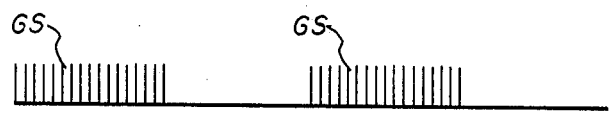
FIG. 6 is a diagram showing the gating signals for silicon rectifiers 5 and 7 of the embodiment shown in FIGS. 3 and 4.
Figure 7:
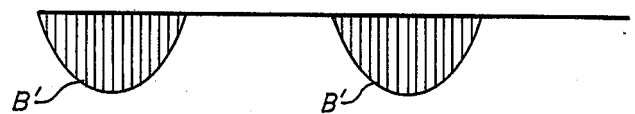
FIG. 7 is a diagram illustrating the effective current passing through the silicon controlled rectifiers 5 and 7.
Figure 8:
FIG. 8 is a diagram showing the gating signals for silicon controlled rectifiers 6 and 8 of the embodiment shown in FIGS. 3 and 4.
Figure 9:
FIG. 9 is a diagram showing the effective current passing through silicon controlled rectifiers 6 and 8 of the embodiment shown in FIGS. 3 and 4.

A gating means 68 is mounted with secondary 18 of transformer 10 for sequentially passing the pulses in the negative sine wave component B' of the effective current followed by the pulses in the positive sine wave component A', as shown in FIGS. 7 and 9. This is accomplished by passing the pulses received in secondary winding 18 synchronously with the pulses in each half cycle of the pulse train to form the chosen frequency alternating current component. Preferably, gating means 68 includes the cathode of a fifth silicon controlled rectifier 70 and the anode of a sixth silicon controlled rectifier 72 shunted to end 24 of secondary winding 18 of transformer 10, while the cathode of a seventh silicon controlled rectifier 74 and the anode of an eighth silicon controlled rectifier 76 are shunted to other end 22. As shown in FIG. 4, a combining circuit 78 is shunted to the signals of first signal generating means 40, for firing the 5th and 7th rectifiers 70 and 74, respectfully, synchronously with the second and fourth rectifiers 30 and 36, and shunted to signal generating means 54 for firing the 6th and 8th rectifiers 72 and 76, respectfully, synchronously with the first and third rectifiers 28 and 34. Combining circuit 78 passes a signal through the primary 80 of a firing transformer 82 which transmits the signal through the secondary winding 84 (FIG. 3) mounted with the gate of 5th rectifier 70 and secondary winding 86 (FIG. 3) mounted with the gate of 7th rectifier 74 for firing these rectifiers synchronously with second and fourth rectifiers 30 and 36, respectively, to provide the series of gating pulses GS shown in FIG. 6. Further, combining circuit 78 transmits signals through the primary 88 of a firing transformer 90 which carries the signal through secondary winding 92 (FIG. 3) mounted with the gate of 6th rectifier 72 and through secondary winding 94 (FIG. 3) mounted with the gate of 8th rectifier 76 for synchronous firing with first and third rectifiers 28 and 34, respectively, to provide the series of gating pulses GS' shown in FIG. 8. The chosen frequency of the effective current is proportionate to the differences between the firing signal frequencies of first firing signal generating means 40 and second firing signal generating means 54. Should either drive 42 or 56 be a three phase generator and the other drive be a single phase generator, three phase alternating current is provided.

Figure 10:
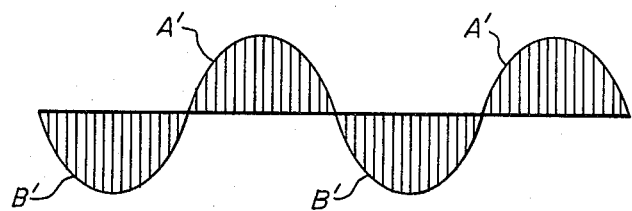
FIG. 10 is a diagram showing the resulting effective current from the embodiment of the invention shown in FIGS. 3 and 4.

A filter 96 is mounted to the anodes of 5th rectifier 70 and 7th rectifier 74 and with the cathodes of 6th rectifier 72 and 8th rectifier 76 for removing selected components of the gated signal while providing an output of the chosen frequency alternating current shown in FIG. 10. Preferably, this filter is a low pass L-C filter with the inductor 98 being mounted with the rectifiers and the capacitor 100 leading to ground 102.

Any load 104 may be provided for receiving the chosen frequency alternating current, but preferably, this load is a motor, which is controlled by varying the firing signal frequency from signal generator 56.

From the foregoing it will be seen that this invention is one well adapted to attain all the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Power converting apparatus for changing direct current to a chosen frequency alternating current,
a transformer having
a primary winding with the direct current supplied intermediate its ends; and
a secondary winding being grounded intermediate its ends;
means mounted with the primary of said transformer for converting the direct current to a series of pulses in the primary winding which includes a pulse train forming an effective current with reciprocal positive and negative sine wave components for each half cycle of the chosen frequency wherein said converting means includes first and second silicon controlled rectifiers mounted in series with one end of the primary winding of said transformer, third and fourth silicon controlled rectifiers mounted in series with the other end of the primary, first signal generating means for alternatively firing the first and third silicon controlled rectifiers, and second signal generating means for simultaneously firing the second and fourth silicon controlled rectifiers, wherein said first and second signal generating means provide firing signals of different frequencies and chosen frequency of the effective current being proportionate to the difference between the firing signal frequencies;
gating means mounted with the secondary of said transformer for sequentially passing the pulses in the negative sine wave component of the effective current followed by the pulses in the positive sine wave component, said gating means passing the pulses received in the secondary winding synchronously with the pulses in each half cycle of the pulse train to form a chosen frequency alternating current component; and
a filter mounted with the said gating means for removing selected components of the gated signal while providing an output of the chosen frequency alternating current.

2. The converter of claim 1, wherein said converting means includes first and second silicon controlled rectifiers mounted in series with one end of the primary winding of said transformer, third and fourth silicon controlled rectifiers mounted in series with the other end of the primary, first signal generating means for alternatively firing the first and third silicon controlled rectifiers, and second signal generating means for simultaneously firing the second and fourth silicon controlled rectifiers.

3. The converter of claim 2, wherein said first and second signal generating means provide firing signals of different frequencies and chosen frequency of the effective current being proportionate to the difference between the firing signal frequencies.

4. The converter of claim 1, wherein the first and second signal generating means include first and second drivers, respectively, the first driver being a three phase generator and the second driver being a single phase generator for providing three phase alternating current.

5. The converter of claim 1, wherein said gating means includes fifth and sixth silicon controlled rectifiers shunted to one end of the secondary winding of said transformer, seventh and eighth silicon controlled rectifiers shunted to the other end of the secondary winding of said transformer, a circuit combining the signals of said first and second signal generating means for firing the fifth and seventh rectifiers synchronously with the second and fourth rectifiers and for firing the sixth and eighth rectifiers synchronously with the first and third rectifiers.

6. The converter of claim 5, wherein said first and second firing signal generating means provide firing signals of different frequencies and the chosen frequency of the effective current is proportionate to the difference between the firing signal frequencies.

7. The converter of claim 1, wherein the first and second signal generating means include first and second high frequency drivers, respectively, and the filter is a low pass filter for passing low frequency alternating current while removing high frequency current.

8. The converter of claim 7, wherein said low pass filter is an L-C filter.

* * * * *